(12) United States Patent
Saidi et al.

(10) Patent No.: US 7,702,598 B2
(45) Date of Patent: *Apr. 20, 2010

(54) METHODS AND SYSTEMS FOR PREDICTING OCCURRENCE OF AN EVENT

(75) Inventors: Olivier Saidi, Greenwich, CT (US); David Verbel, New York, NY (US); Lian Yan, Chester Springs, PA (US)

(73) Assignee: Aureon Laboratories, Inc., Yonkers, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 12/009,543

(22) Filed: Feb. 21, 2008

(65) Prior Publication Data

US 2008/0306893 A1    Dec. 11, 2008

Related U.S. Application Data

(63) Continuation of application No. 11/067,066, filed on Feb. 25, 2005, now Pat. No. 7,321,881.

(60) Provisional application No. 60/548,322, filed on Feb. 27, 2004, provisional application No. 60/577,051, filed on Jun. 4, 2004.

(51) Int. Cl.
    *G06N 3/08*    (2006.01)
(52) U.S. Cl. .......................... 706/21; 706/62
(58) Field of Classification Search .................... 706/21
    See application file for complete search history.

(56) References Cited

U.S. PATENT DOCUMENTS 4,097,845 A    6/1978    Bacus (Continued)

FOREIGN PATENT DOCUMENTS

WO    WO 96/09594    3/1996

OTHER PUBLICATIONS

Effectiveness of Artificial Neural Networks in forecasting failure risk for pre-medical students, Alenezi, J. K.; Awny, M. M.; Fahmy, M. M. M.; Computer Engineering & Systems, 2009. ICCES 2009. International Conference on Dec. 14-16, 2009 pp. 135-138 Digital Object Identifier 10.1109/ICCES.2009.5383294.*

(Continued)

*Primary Examiner*—Michael B Holmes
(74) *Attorney, Agent, or Firm*—Mintz, Levin, Cohn, Ferris, Glovsky & Popeo PC

(57) ABSTRACT

Embodiments of the present invention are directed to methods and systems for training a neural network having weighted connections for classification of data, as well as embodiments corresponding to the use of such a neural network for the classification of data, including, for example, prediction of an event (e.g., disease). The method may include inputting input training data into the neural network, processing, by the neural network, the input training data to produce an output, determining an error between the output and a desired output corresponding to the input training data, rating the performance neural network using an objective function, wherein the objective function comprises a function C substantially in accordance with an approximation of the concordance index and adapting the weighted connections of the neural network based upon results of the objective function.

18 Claims, 7 Drawing Sheets

The comparison of survival curves for the high-risk and low-risk patient groups between $NN_{ci}$ and $NN_{km}$. Note that the low risk group of $NN_{km}$ consists of 84 patients because of tied scores.

U.S. PATENT DOCUMENTS

| | | | |
|---|---|---|---|
| 5,016,283 | A | 5/1991 | Bacus et al. |
| 5,474,796 | A | 12/1995 | Brennan |
| 5,526,258 | A | 6/1996 | Bacus |
| 5,701,369 | A | 12/1997 | Moon et al. |
| 5,769,074 | A | 6/1998 | Barnhill et al. |
| 6,025,128 | A | 2/2000 | Veltri et al. |
| 6,059,724 | A | 5/2000 | Campell et al. |
| 6,063,026 | A | 5/2000 | Schauss et al. |
| 6,137,899 | A | 10/2000 | Lee et al. |
| 6,317,731 | B1 | 11/2001 | Luciano |
| 6,409,664 | B1 | 6/2002 | Kattan et al. |
| 6,410,043 | B1 | 6/2002 | Steiner et al. |
| 6,413,533 | B1 | 7/2002 | Steiner et al. |
| 6,413,535 | B1 | 7/2002 | Steiner et al. |
| 6,427,141 | B1 | 7/2002 | Barnhill |
| 6,472,415 | B1 | 10/2002 | Sovak et al. |
| 6,534,266 | B1 | 3/2003 | Singer |
| 6,545,034 | B1 | 4/2003 | Carson et al. |
| 6,545,139 | B1 | 4/2003 | Thompson et al. |
| 6,611,833 | B1 | 8/2003 | Johnson |
| 6,658,395 | B1 | 12/2003 | Barnhill |
| 6,789,069 | B1 | 9/2004 | Barnhill et al. |
| 6,821,767 | B1 | 11/2004 | French et al. |
| 6,828,429 | B1 | 12/2004 | Srivastava et al. |
| 6,906,320 | B2 | 6/2005 | Sachs et al. |
| 6,944,602 | B2 | 9/2005 | Cristianini |
| 6,949,342 | B2 | 9/2005 | Golub et al. |
| 6,995,020 | B2 | 2/2006 | Capodieci et al. |
| 7,052,908 | B2 | 5/2006 | Chang |
| 7,071,303 | B2 | 7/2006 | Lin |
| 7,105,560 | B1 | 9/2006 | Carson et al. |
| 7,105,561 | B2 | 9/2006 | Carson et al. |
| 7,129,262 | B2 | 10/2006 | Carson et al. |
| 7,151,100 | B1 | 12/2006 | Carson et al. |
| 7,189,752 | B2 | 3/2007 | Carson et al. |
| 7,211,599 | B2 | 5/2007 | Carson et |
| 7,229,774 | B2 | 6/2007 | Chinnaiyan et al. |
| 7,245,748 | B2 | 7/2007 | Degani et al. |
| 7,309,867 | B2 | 12/2007 | Costa et al. |
| 7,321,881 | B2 * | 1/2008 | Saidi et al. ............... 706/21 |
| 7,326,575 | B2 | 2/2008 | Capodieci et al. |
| 7,332,290 | B2 | 2/2008 | Rubin et al. |
| 7,361,680 | B2 | 4/2008 | Carson et al. |
| 7,389,277 | B2 * | 6/2008 | Chen et al. ............... 706/21 |
| 7,393,921 | B2 | 7/2008 | Lin |
| 7,409,321 | B2 * | 8/2008 | Repucci et al. ........... 702/189 |
| 7,418,399 | B2 * | 8/2008 | Schaeffer et al. ............ 705/2 |
| 7,461,048 | B2 * | 12/2008 | Teverovskiy et al. ........ 706/62 |
| 7,467,119 | B2 * | 12/2008 | Saidi et al. ............... 706/21 |
| 7,483,554 | B2 * | 1/2009 | Kotsianti et al. ........... 382/128 |
| 7,490,071 | B2 * | 2/2009 | Milenova et al. ........... 706/45 |
| 7,499,891 | B2 * | 3/2009 | Hitt ......................... 706/12 |
| 7,505,948 | B2 * | 3/2009 | Saidi et al. ............... 706/14 |
| 7,542,961 | B2 * | 6/2009 | Gogolak .................... 706/62 |
| 7,565,370 | B2 * | 7/2009 | Milenova et al. .......... 707/102 |
| 7,599,893 | B2 * | 10/2009 | Sapir et al. ............... 706/12 |
| 7,601,532 | B2 * | 10/2009 | Nakagawara et al. .... 435/287.2 |
| 7,627,489 | B2 * | 12/2009 | Schaeffer et al. ............ 705/2 |
| 7,632,460 | B2 * | 12/2009 | Catt et al. ................. 422/56 |
| 2001/0036631 | A1 | 11/2001 | McGrath et al. |
| 2002/0086347 | A1 | 7/2002 | Johnson et al. |
| 2002/0165837 | A1 | 11/2002 | Zhang et al. |
| 2002/0196964 | A1 | 12/2002 | Stone et al. |
| 2003/0048931 | A1 | 3/2003 | Johnson et al. |
| 2003/0170852 | A1 | 9/2003 | Allikmets et al. |
| 2003/0172043 | A1 | 9/2003 | Guyon et al. |
| 2003/0235816 | A1 | 12/2003 | Slawin et al. |
| 2004/0157255 | A1 | 8/2004 | Agus et al. |
| 2004/0265928 | A1 | 12/2004 | Kennedy |
| 2005/0071300 | A1 | 3/2005 | Bartlett et al. |
| 2007/0099219 | A1 | 5/2007 | Teverovskiy et al. |

OTHER PUBLICATIONS

Risk Factors for Apgar Score using Artificial Neural Networks, Ibrahim, D.; Frize, M.; Walker, R.C.; Engineering in Medicine and Biology Society, 2006. EMBS '06. 28th Annual International Conference of the IEEE Aug. 30, 2006-Sep. 3, 2006 pp. 6109-6112 Digital Object Identifier 10.1109/IEMBS.2006.259591.*

Automatic Prediction System of Dengue Haemorrhagic-Fever Outbreak Risk by Using Entropy and Artificial Neural Network, Rachata, N.; Charoenkwan, P.; Yooyativong, T.; Chamnongthal, K.; Lursinsap, C.; Higuchi, K.; Communications and Information Technologies, 2008. ISCIT 2008. International Symposium on Oct. 21-23, 2008 pp. 210-214.*

Prediction of a patient's response to a specific drug treatment using artificial neural networks, Valafar, H.; Valafar, F.; Neural Networks, 1999. IJCNN '99. International Joint Conference on vol. 5, Jul. 10-16, 1999 pp. 3694-3697 vol. 5 Digital Object Identifier 10.1109/IJCNN.1999.836271.*

Using an artificial neural network to predict necrotizing enterocolitis in premature infants, Mueller, M.; Taylor, S.N.; Wagner, C.L.; Almeida, J.S.; Neural Networks, 2009. IJCNN 2009. International Joint Conference on Jun. 14-19, 2009 pp. 2172-2175 Digital Object Identifier 10.1109/IJCNN.2009.5178635.*

Decision Fusion of Machine Learning Models to Predict Radiotherapy-Induced Lung Pneumonitis, Das, S.K.; Shifeng Chen; Deasy, J.O.; Sumin Zhou; Fang-Fang Yin; Marks, L.B.; Machine Learning and Applications, 2008. ICMLA '08. Seventh International Conference on Dec. 11-13, 2008 pp. 545-550 Digital Object Identifier 10.1109/ICMLA.2008.122.*

Predicting local and distant metastasis for breast cancer patients using the Bayesian neural network Poh Lian Choong; deSilva, C.J.S.; Attikiouzel, Y.; Digital Signal Processing Proceedings, 1997. DSP 97., 1997 13th International Conference on vol. 1, Jul. 2-4, 1997 pp. 83-88 vol. 1 Digital Object Identifier 10.1109/ICDSP.1997.627974.*

Predicting High-Risk Preterm Birth Using Artificial Neural Networks, Catley, C.; Frize, M.; Walker, C.R.; Petriu, D.C.; Information Technology in Biomedicine, IEEE Transactions on vol. 10, Issue 3, Jul. 2006 pp. 540-549 Digital Object Identifier 10.1109/TITB.2006.872069.*

Aaltomaa S, Karja V, Lipponen P, et al. Expression of Ki-67, cyclin D1 and apoptosis markers correlated with survival in prostate cancer patients treated by radical prostatectomy. *Anticancer Res.* 2006;26(6C):4873-4878.

Ablameyko S., et al. "From cell image segmentation to differential diagnosis of thyroid cancer", Pattern Recognition, 2002. Proceedings. 16*th* International Conference on Quebec City, Que., Canada Aug. 11-15, 2002, Los Alamitos, CA, USA, IEEE Compout. Soc, Us, vol. 1, Aug. 11, 2002, pp. 763-766.

Albertsen PC, Hanley JA, Fine J. 20-year outcomes following conservative management of clinically localized prostate cancer. *Jama.* 2005;293(17):2095-2101.

Antonini, M., et al., "Image coding using wavelet transform," *IEEE Trans. Image Process.*, vol. 1, pp. 205-220, 1992.

Baatz M., et al., "Multiresolution Segmentation—An Optimization Approach for High Quality Multi-scale Image Segmentation," In *Angewandte Geographische Informationsverarbeitung* XII, Strobl, J., Blaschke, T., Griesebner, G. (eds.), Wichmann—Verlag, Heidelberg, pp. 12-23, 2000.

Baish, J. W. et al., Fractals and cancer, *Cancer Research*, vol. 60, pp. 3683-3688, 2000.

Berry DA, Cirrincione C, Henderson IC, et al. Estrogen-receptor status and outcomes of modern chemotherapy for patients with node-positive breast cancer. *Jama* 2006;295:1658-6714.

Bertrand PV, Holder RL. A quirk in multiple regression: the whole regression can be greater than the sum of its parts. *Statistician.* 1988;37(4/5):371-374.

Bettencourt MC, Bauer JJ, Sesterhenn IA, Mostofi FK, McLeod DG, Moul JW. Ki-67 expression is a prognostic marker of prostate cancer recurrence after radical prostatectomy. *J Urol.* 1996;156(3):1064-1068.

Biganzoli, E., et al. Feed forward neural networks for the analysis of censored survival data: a partial logistic regression approach. *Stat Med*, 1998.

Bill-Axelson A, Holmberg L, Ruutu M, et al. Radical prostatectomy versus watchful waiting in early prostate cancer. *N. Engl J Med*. 2005;352(19):1977-1984.

Brown, et al. Knowledge-based analysis of microarray gene expression data by using support vector machines. Proc Natl Acad Sci U S A 97:262-7, 2000.

Brown, S.F., et al. On the use of artificial neural networks for the analysis of survival data. *IEEE Trans. on Neural Networks*, 8(5):1071-1077, 1997.

Bubendorf L, Tapia C, Gasser TC, et al. Ki67 labeling index in core needle biopsies independently predicts tumor-specific survival in prostate cancer. *Hum Pathol*. 1998;29(9):949-954.

Burke, H.B., et al. Artificial neural networks improve the accuracy of cancer survival prediction. *Cancer*, 97(4): pp. 857-862, 1997.

Camp, R., G. G. Chung, and D. L. Rimm, "Automated subcellular localization and quantification of protein expression in tissue microarrays," *Nature Medicine*, vol. 8, pp. 1323-1327, 2002.

Chen CD, Welsbie DS, Tran C, et al. Molecular determinants of resistance to antiandrogen therapy. *Nat Med* 2004; 10:33-91.

Churilov, L., et al., Improving risk grouping rules for prostate cancer patients with optimization, *System Sciences*, 2004. Proceedings of the 37th Annual Hawaii International Conference, pp. 1-9. Digital Object Identifier 10. 1109/HICSS.2004.1265355.

Coleman K, van Diest PJ, Baak JP, Mullaney J. Syntactic structure analysis in uveal melanomas. *Br J Ophthalmol*. 1994;78(11):871-874.

Cooperberg MR, Broering JM, Litwin MS, et al. The contemporary management of prostate cancer in the United States: lessons from the cancer of the prostate strategic urologic research endeavor (CapSURE), a national disease registry. *J Urol* 2004;171:1393-4014.

Office Action corresponding to U.S. Appl. No. 10/991,240, mailed May 28, 2008, 22 pgs.

Cox, R., "Regression models and life tables (with discussion)," *Journal of the Royal Statistical Society*, Series B, vol. 34, pp. 187-220, 1972.

Cuzick J, Fisher G, Kattan MW, et al. Long-term outcome among men with conservatively treated localised prostate cancer. *Br J Cancer*. 2006;95(9):1186-1194.

Daubechies, I, *Ten Lectures on Wavelets*, SIAM, Philadelphia, PA, 1992, pp. 198-202 and pp. 254-256.

Davidov, E., et al. Advancing drug discovery through systems biology. *Drug Discov Today*, 8:175-183, 2003.

de la Taille A, Katz Ae, Bagiella E, et al. Microvessel density as a predictor of PSA recurrence after radical prostatectomy. A comparison of CD34 and CD31. *Am J Clin Pathol*. 2000;113(4):555-562.

Definiens Cellenger Architecture: A Technical Review, Apr. 2004.

deSilva, C.J. S., et al. Artificial neural networks and breast cancer prognosis. *Australian Comput. J*. 26:78-81, 1994.

Dhanasekaran, S.M., Barrette, T.R., Ghosh, D., Shah, R., Varambally, S., Kurachi, K., Pienta, K.J., Rubin, M.A., and Chinnaiyan, A.M. 2001. Delineation of prognostic biomarkers in prostate cancer. *Nature* 412:822-826.

Diamond, J., et al., "The use of morphological characteristics and texture analysis in the identification of tissue composition in prostatic neoplasia," *Human Pathology*, vol. 35, pp. 1121-1131, 2004.

Duda, R.O., et al., *Pattern Classification*, 2nd ed. Wiley, New York, 2001, pp. 483-484.

Egmont-Petersen M. et al ., "Image Processing with Neural Networks-a-Review", Pattern Recognition, Elsevier, Kidlington, GB, vol. 35, No. 10, Oct. 2002, pp. 2279-2301.

Eskelinen, M., Lipponen, P., Majapuro, R., and Syrjanen, K. 1991. Prognostic factors in prostatic adenocarcinoma assessed by means of quantitative histology. *Eur Urol* 19:274-278.

Fayyad,U.M., et al. Knowledge Discovery and Data Mining : Towards a unifying framework. In Proceedings of the Second International Conference on Knowledge Discovery and Data Mining, Portland, 1996. AAAI Press.

Freedland, S.J., et a., Risk of prostate cancer-specific mortality following biochemical recurrence after radical prostatectomy, 2005. *Jama* 294:433-439.

Freiha, F.S., McNeal, J.E., and Stamey, T.A. 1988. Selection criteria for radical prostatectomy based on morphometric studies in prostate carcinoma. *NCI Monogr*: 107-108.

Fukunaga, K., *Introduction to Statistical Pattern Recognition*, 2nd ed. New York: Academic, 1990, p. 125.

Gonzales, R.C., et al., *Digital Image Processing*. Addison-Wesley, New York, 1992, pp. 173-185.

Gonzalgo ML, Bastian PJ, Mangold LA, et al. Relationship between primary Gleason pattern on needle biopsy and clinicopathologic outcomes among men with Gleason score 7 adenocarcinoma of the prostate. *Urology*. 2006;67(1):115-119.

Gordon, A., A. Colman-Lerner, T. E. Chin, K. R. Benjamin, R. C. Yu, and R. Brent, "Single-cell quantification of molecules and rates using open-source microscope-based cytometry," *Nature Methods*, vol. 4, pp. 175-181, 2007.

Graefen M., et al. A validation of two preoperative nomograms predicting recurrence following radical prostatecotmy in a cohort of European men. Urol Oncol 7:141-6, 2002.

Graefen M., et al. International validation of a preoperative nomogram for prostate cancer recurrence after radical prostatectomy. J. Clin Oncol 20:3206-12, 2002.

Graefen, M., et al. Validation study of the accuracy of a postoperative nomogram for recurrence after radical prostatectomy for localized prostate cancer. *Journal of Clin Oncol*, 20:951-956, 2002.

Grober Ed, Tsihlias J, Jewett MA, et al. Correlation of the primary Gleason pattern on prostate needle biopsy with clinico-pathological factors in Gleason 7 tumors. *Can J Urol*. 2004;11(1):2157-2162.

Gronberg, H, Prostate cancer epidemiology, *Lancet*, 361:859-864, 2003.

Grossman , M, et al. Androgen receptor signaling in androgen-refractory. *J National Cancer Institute*,2001; 93(2):1687-1697.

Guyon I, et al. Gene selection for cancer classification using support vector machines. Machine Learning 1:S316-22, 2002.

Halabi S, et al. Prognostic model for predicting survival in men with hormone-refractory metastatic prostate cancer. J. Clin Oncol 21:1232-7, 2003.

Halvorsen OJ, Haukaas S, Hoisaeter PA, Akslen LA. Independent prognostic importance of microvessel density in clinically localized prostate cancer. *Anticancer Res*. 2000;20(5C):3791-3799.

Hameed O, Humphrey PA. Immunohistochemistry in diagnostic surgical pathology of the prostate. Semin Diagn Pathol 2005;22:88-1041.

Harashima K, Akimoto T, Nonaka T, Tsuzuki K, Mitsuhashi N, Nakano T. Heat shock protein 90 (Hsp90) chaperone complex inhibitor, radicicol, potentiated radiation-induced cell killing in a hormone-sensitive prostate cancer cell line through degradation of the androgen receptor. *Int J Radiat Biol* 2005;81:63-761.

Harlan, William S. "Optimization of a Neural Network", Feb. 1999 (5 pp.) accessed at http://billharlan.com/pub/papers/neural/ on Mar. 1, 2006.

Harrell, F.E., et al. Evaluating the yield of medical tests. *JAMA*, 247(18):2543-2546, 1982.

Harrell, F.E., Regression Modeling Strategies, Springer-Verlag 2001, pp. 247 and 493.

Hoffmann K, et al.; *UR Mol Biotechnol*. 29,31-38 (2005).

Holmberg L, Bill-Axelson A, Helgesen F, et al. A randomized trial comparing radical prostatectomy with watchful waiting in early prostate cancer. *N Engl J Med*. 2002;347(11):781-789.

Hood, L., Systems biology: integrating technology, biology, and computation. *Mech Ageing Dev*, 124:9-16, 2003.

Huggins C, Hodges CV. Studies on prostate cancer: I: The effects of castration, of estrogen and of androgen injection on serum phosphatases in metastatic carcinoma of the prostate. *Cancer Res* 1941;1:293-7.

Hull GW, Rabbani F, Abbas F, Wheeler TM, Kattan MW, Scardino PT. Cancer control with radical prostatectomy alone in 1,000 consecutive patients. *J Urol* 2002;167:528-342 Pt 1.

Hurwitz, M.D., DeWeese, T.L., Zinreich, E.S., Epstein, J.I., and Partin, A.W. 1999. Nuclear morphometry predicts disease-free interval for clinically localized adenocarcinoma of the prostate treated with definitive radiation therapy. *Int J Cancer* 84:594-597.

Ideker, T., Galitski, T., and Hood, L. 2001. A new approach to decoding life: systems biology. *Annu Rev Genomics Hum Genet* 2:343-372. (2001).

Inoue, T., et al., Androgen receptor, Ki67, and p53 expression in radical prostatectomy specimens predict treatment failure in Japanese population. *Urology* 66:332-337,2005.

International Search Report dated Dec. 19, 2005, corresponding to PCT/US2005/008350, 1 pg.

International Search Report for PCT/US2004/038778, Mailed Jul. 2, 2008, 1 pg.

International Search Report and Written Opinion issued Mar. 15, 2007 for PCT/US2006/040294, 13 pgs.

Jacquin, A.E., Fractal image coding: A review, *Proc. IEEE*, vol. 81, pp. 1451-1465, 1993.

Johansson JE, Andren O, Andersson SO, et al. Natural history of early, localized prostate cancer. *Jama* 2004;291:2713-922.

Julious SA, Mullee MA. Confounding and Simpson's paradox. *Bmj.* 1994;309(6967):1480-1481.

Kaplan E.L., et al. (1958), "nonparametric Estimation from Incomplete Observatinos," JASA, 53, pp. 457-481.

Kattan, M.W., et al. A preoperative nomogram for disease recurrence following radical prostatectomy for prostate cancer. J. Natl. Cancer Inst. 90:766-771, 1998.

Kattan, M.W. et al. Experiments to determine whether recursive partitioning or an artificial neural network overcomes theoretical limitation of cox proportional hazards regression. *Comput Biomed Res*, 31(5):363-373, 1998.

Kattan, M.W., et al. Postoperative nomogram for disease recurrence after radical prostatectomy for prostate cancer. *Journal of Clin Oncol*, 17:1499-1507, 1999.

Khatami A, Pihl CG, Norrby K, Hugosson J, Damber JE. Is tumor vascularity in prostate core biopsies a predictor of PSA recurrence after radical prostatectomy? *Acta Oncol.* 2005;44(4):362-368.

Kim J, Jia L, Stallcup MR, Coetzee GA. The role of protein kinase A pathway and cAMP responsive element-binding protein in androgen receptor-mediated transcription at the prostate-specific antigen locus. *J Mol Endocrinol.* 2005;34(1):107-118.

Kim K.S. et al., "Automatic classification of cells using morphological shape in peripheral blood images", Proceedings of the SPIE—the international society for optical engineering spie-int. soc. Opt. eng USA, vol. 4210, 2000, (290-298 pp).

Klein, J.P., et al. *Survival Analysis: Techniques for Censored and Truncated Data.* Springer, New York, 1997, pp. 247-335.

Klotz L. Active surveillance versus radical treatment for favorable-risk localized prostate cancer. *Curr Treat Options Oncol.* 2006;7(5):355-362.

Kosman D., et al.; *Science*, 305, 846 (2004).

Krtolica, A., C. O. de Solorzano, S. Lockett and J. Campisi, "Quantification of epithelial cells in coculture with fibroblast by fluorescence image analysis," *Cytometry*, vol. 49, pp. 73-82, 2002.

Laine, A., et al., "Texture classification by wavelet packet signatures," *IEEE Trans. Pattern Anal. Machine Intell.*, vol. 15, pp. 1186-1191, 1993.

Landini, G., "Applications of fractal geometry in pathology," in *Fractal Geometry in Biological Systems: An Analytical Approach*, P.M. Iannaccone and M. Kohokha, Eds. CRC Press, Boca Raton, FL, 1996, pp. 205-246.

LaTulippe, E., Satagopan, J., Smith, A., Scher, H., Scardino, P., Reuter, V., and Gerald, W.L. 2002., Comprehensive gene expression analysis of prostate cancer reveals distinct transcriptional programs associated with metastatic disease. *Cancer Res* 62:4499-4506.

Lee Y-J, Mangasarian OL, Wolberg WH. Breast cancer survival and chemotherapy: a support vector machine analysis. *DIMACS Series in Discrete Mathematics and Theoretical Computer Science.* 2000;55:1-10.

Li H, Luan Y. Kernel Cox regression models for linking gene expression profiles to censored survival data. *Pac Symp Biocomput* 2003:65-76.

Li, R., Wheeler, T., Dai, H., Frolov, A., Thompson, T., and Ayala, G. 2004. High level of androgen receptor is associated with aggressive clinicopathologic features and decreased biochemical recurrence-free survival in prostate: cancer patients treated with radical prostatectomy. *Am J Surg Pathol* 28:928-934 (2004).

Lin Y, Kokontis J, Tang F, et al. Androgen and its receptor promote Bax-mediated apoptosis. *Mol Cell Biol* 2006;26:1908-165.

Liu, D.C., et al. On the limited memory bfgs method for large scale optimization. *Mathematical Programming*, 45:503-528, 1989.

Lu, N., *Fractal Imaging.* Academic, San Diego, CA 1997.

Luo, J., Duggan, D.J., Chen, Y., Sauvageot, J., Ewing, C.M., Bittner, M.L., Trent, J.M., and Isaacs, W.B. 2001, Human prostate cancer and benign prostatic hyperplasia: molecular dissection by gene expression profiling. *Cancer Res* 61:4683-4688 (2001).

Luo, J.H., et al., Gene expression analysis of prostate cancers. *Mol Carcinog* 33:25-35 (2002).

Luo, Jun, et al., α-Methylacyl-CoA Racemase: A new molecular marker for prostate cancer, *Cancer Research*, 62;220-226, 2002.

Messing EM, et al., Immediate hormonal therapy compared with observation after radical prostatectomy and pelvic lymphadenectomy in men with node-positive prostate cancer. *N Engl J Med* 341:1781-824 (1999).

Messing EM, Thompson I, Jr. Follow-up of conservatively managed prostate cancer: watchful waiting and primary hormonal therapy, *Urol Clin North Am* 30:687-702, viii4 (2003).

Mohler JL, et al. Nuclear roundness factor measurement for assessment of prognosis of patients with prosatatic carcinoma. I, Testing of a digitization system. J. Urol 139:1080-4, 1988.

Molinaro, A. et al., Tree-based Multivariate Regression and Density Estimation with Right-Censored Data. University of California, U.C. Berkeley Division of Biostatistics Working Paper Series, 2003, 1-50.

Moul JW, Wu H, Sun L, et al. Early versus delayed hormonal therapy for prostate specific antigen only recurrence of prostate cancer after radical prostatectomy. J Urol 171:1141-73 (2004).

Mucci NR, Rubin MA, Strawderman MS, Montie JE, Smith Dc, Pienta KJ. Expression of nuclear antigen Ki-67 in prostate cancer needle biopsy and radical prostatectomy specimens. *J Natl Cancer Inst.* 2000;92(23):1941-1942.

Ohno-Machado, et al. Modular neural networks for medical prognosis: Quantifying the benefits of combining neural networks for survival prediction, *Connection Science*, 9:71-86, 1997.

Olinici CD, et al. Computer-based image analysis of nucleoli in prostate carcinoma. Rom J. Morphol Embryol 43:163-7, 1997.

Osuna, E.E., et al. Support Vector Machines : Training and Applications. A.I. Memo 1602/C.B.C.L. Paper 144, MIT, 1997.

Partin AW, et al. Use of nuclear morphometry, Gleason histologic scoring, clinical stage, and age predict disease-free survival among patients with prostate cancer. Cancer 70:161-168, 1992.

Pasquier, D, et al., MRI alone simulation for conformal radiation therapy of prostate cancer: Technical Aspects, *Engineering in Medicine and Biology Society*, 2006. EMBS 28th Annual International Conference of the IEEE, pp. 160-163.

Pollack A, DeSilvio M, Khor LY, et al. Ki-67 staining is a strong predictor of distant metastasis and mortality for men with prostate cancer treated with radiotherapy plus androgen deprivation: Radiation Therapy Oncology Group Trial 92-02. *J Clin Oncol.* 2004;22(11):2133-2140.

Pouliot, S., et al., Automatic detection of three radio-opaque markers for prostate targeting using EPID during radiation therapy, *Image Proceedings.* 2001 International Conference on vol. 2, 2001 pp. 857-860, Digital Object Identifier 10.1109/ICIP.2001.958629.

Rakotomamonjy, A., Variable Selection Using SVM-based Criteria, J of Machine Learning Research, 2003; (3)1357-1370.

Ramaswamy, S., Ross, K.N., Lander, E.S., and Golub, T.R. 2003. A molecular signature of metastasis in primary solid tumors. *Nat Genet* 33:49-54 (2003).

Rao, J.Y., D. Seligson, and G. P. Hemstreet, "Protein expression analysis using quantitative fluorescence image analysis on tissue microarray slides," *BioTechniques*, vol. 32:924-932 (2002).

Rhodes, D.R., Barrette, T.R., Rubin, M.A., Ghosh, D., and Chinnaiyan, A.M. 2002. Meta-analysis of microarrays: interstudy validation of gene expression profiles reveals pathway dysregulation in prostate cancer. Cancer Res 62:4427-4433 (2002).

Roula, M.A., et al., "A multispectral computer vision system for automatic grading of prostatic neoplasia," in *Proc. Proc. IEEE Int. Symp. Biomed. Imaging*, Washington, DC, 2002, pp. 193-196.

Rubin MA, Bismar TA, Andren O, Mucci L, Kim R, Shen R, Ghosh D, Wei J, Chinnaiyan a, Adami O, Kantoff P, Johansson J-E.

Decreased a-methylacyl CoA racemase expression in localized prostate cancer is associated with an increased rate of biochemical recurrence and cancer-specific death. *Cancer Epid Bio Prev* 2005;14:1424-1432.

Sabino D M U et al., "Toward leukocyte recognition using morphometry, texture and color", Biomedical Imaging: Macro To Nano, 2004. IEEE International Symposium on Arlington VA, USA Apr. 15-18, 2004, Piscataway, NJ USA, IEEE, Apr. 15, 2004, pp. 121-124.

Sadi MV, Barrack ER. Androgen receptors and growth fraction in metastatic prostate cancer as predictors of time to tumour progression after hormonal therapy. *Cancer Surv* 11:195-215 (1991).

Sadi MV, Barrack ER. Image analysis of androgen receptor immunostaining in metastatic prostate cancer. Heterogeneity as a predictor of response to hormonal therapy. *Cancer* 71:2574-808 (1993).

Scheipers, U., et al., Ultrasonic multifeature tissue characterization for the early detection of prostate cancer, Ultrasonics Symposium, 2001. IEEE vol. 2 pp. 1265-1268.

Scher HI, et al. Clinical states in prostate cancer: towards a dynamic model of disease progression. Urology 55:323-327, 2000.

Schoelkopf B. et al., "Comparing Support Vector Machines With Gaussian Kernels to Radial Basis Function Classifiers", IEEE Transactions on Signal Processing, IEEE Service Center, New York, NY, US, vol. 45, No. 11, Nov. 1997, pp. 2758-2765.

Schouten, et al., "Feature extraction using fractal codes," in *Proc. Int. Conf. Visual Information and Information Systems*, Amsterdam, 1999, pp. 483-492.

Sharifi N, Gulley JL, Dahut WL. Androgen deprivation therapy for prostate cancer. Jama 2005;294:238-442.

Singh, D., Febbo, P.G., Ross, K., Jackson, D.G., Manola, J., Ladd, C., Tamayo, P., Renshaw, A.A., D'Amico, A.V., Richie, J.P., et al. 2002. Gene expression correlates of clinical prostate cancer behavior. *Cancer Cell* 1:203-209.

Singh, S., et al. Raf kinase inhibitor protein: a putative molecular target in prostate cancer, India Annual Conference, 2004. Proceedings of the IEEE Indicon. 1st, pp. 406-409.

Sloan, A, "Retrieving database contents by image recognition: New fractal power," *Advanced Imaging*, vol. 5, pp. 26-30, 1994.

Smaletz O, et al., Nomogram for overall survival of patients with progressive metastatic prostate cancer after castration. J. Clin Oncol 20:3972-82, 2002.

Smaletz O, Scher HI, Small EJ, et al. Nomogram for overall survival of patients with progressive metastatic prostate cancer after castration. *J Clin Oncol*. 2002;20(19):3972-3982.

Smith, Y, et al., "Similarity measurement method for the classification of architecturally differentiated images," *Comp. Biomed. Res.*, vol. 32, pp. 1-12, 1999.

Smola, A. et al., A Turtorial on Support Vector Regression, NeuroCOLT2 Technical Report Series NCE-TR-1998-030, 1998, 1-73.

Song, Yan, et al., A model-aided segmentation in urethra identification based on an atlas human autopsy image for intesity modulated radiation therapy. *Engineering in Medicine and Biology Society*, 2007. EMBS. 29th Annual International Conference of the IEEE 22-26 pp. 3532-3535.

Snow, P, et al. Artificial neural networks in the diagnosis and prognosis of prostate cancer: a pilot study. *J. Urology*, 152(5):1923-1926, 1997.

Stephenson AJ, Scardino PT, Eastham JA, Bianco F, Dotan ZA, Fearn PA, Kattan M. Preoperative nomogram predicting the 10-year probability of prostate cancer recurrence after radical prostatectomy. A*J Natl Cancer Inst* 2006 98:715-717.

Stephenson AJ, Scardino PT, Eastham JA, et al. Postoperative nomogram predicting the 10-year probability of prostate cancer recurrence after radical prostatectomy. *J Clin Oncol* 2005;23:7005-1228.

Stephenson AJ, Smith A, Kattan MW, et al. Integration of gene expression profiling and clinical variables to predict prostate carcinoma recurrence after radical prostatectomy. Cancer104:290-298 (2005).

Stephenson RA, et al. An image analysis method for assessment of prognostic risk in prostate cancer: a pilot study. Anal Cell Pathol 3:243-8, 1991.

Stotzka, R, et al., "A hybrid neural and statistical classifier system for histopathologic grading of prostate lesions," *Anal. Quant. Cytol. Histol.*, vol. 17, pp. 204-218, 1995.

Su, A.I., Welsh, J.B., Sapinoso, L.M., Kern, S.G., Dimitrov, P., Lapp, H., Schultz, P.G., Powell, S.M., Moskaluk, C.A., Frierson, H.F., Jr., et al. 2001. Molecular classification of human carcinomas by use of gene expression signatures. *Cancer Res* 61:7388-7393.

Sun L, Gancarczyk K, Paquette E, et al. Introduction to Department of Defense Center for Prostate Disease Research Multicenter National Prostate Cancer Database, and analysis of changes in the PSA-era. Urol Oncol 2001;6:203-95.

Swindle P.W., et al., Markers and Meaning of Primary Treatment Failure. Urologic Clinics of North America. 30(2):377-401, May 2003.

Swindle, P., Eastham, J.A., Ohori, M., Kaftan, M.W., Wheeler, T., Maru, N., Slawin, K., and Scardino, P.T. 2005. Do margins matter? The prognostic significance of positive surgical margins in radical prostatectomy specimens. J Urol 174:903-907(2005).

Teverovskiy, M. et al., "Improved prediction of prostate cancer recurrence base on an automated tissue image analysis system," in *Proc. IEEE Int. Symp. Biomed. Imaging*, Arlington, VA, 2004, pp. 257-260.

van Diest PJ, Fleege JC, Baak JP. Syntactic structure analysis in invasive breast cancer: analysis of reproducibility, biologic background, and prognostic value. *Hum Pathol*. 1992;23(8):876-883.

Veltri RW, et al. Quantitative nuclear grade (QNG) : a new image analysis-based biomarker of clinically relevant nuclear structure alterations. J Cell Biochem Suppl Suppl 35:151-7, 2000.

Veltri RW, et al. Quantitative nuclear morphometry, Markovian texture descriptors, and DNA content captured on a CAS-200 Image analysis system, combined with PCNA and HER-2/neuimmunohistochemistry for prediction of prostate cancer progression. J. Cell Biochem Suppl 19:249-58, 1994.

Veltri RW, et al., Ability to predict biochemical progression using Gleason score and a computer-generated quantitative nuclear grade derived from cancer cell nuclei. Urology 48:685-91, 1996.

Veltri RW, et al., Stromal-epithelial measurements of prostate cancer in native Japanese and Japanese-American men, *Prostate Cancer and Prostatic Diseases* (2004) 7: 232-237.

Vonesch, F. Aguet, J. L. Vonesch, and M. Unser, The colored revolution of bioimaging, *IEEE Signal Proc. Mag.*, vol. 23, No. 3, pp. 20-31, May 2006.

Wang N., et al. Morphometry of nuclei of the normal and malignant prostate in relation to DNA ploidy. Anal Quant Cytol Histol 14:210-6, 1992.

Ward JF, Blute ML, Slezak J, Bergstralh EJ, Zincke H. The long-term clinical impact of biochemical recurrence of prostate cancer 5 or more years after radical prostatectomy. J Urol 2003; 170:1872-65.

Welsh, J.B., et al. Analysis of gene expression identifies candidate markers and pharmacological targets in prostate cancer. Cancer Res 61:5974-5978 (2001).

Wetzel, A.W., et al. "Evaluation of prostate tumor grades by content-based image retrieval," in *Proc. SPIE AIPR Workshop on Advances in Computer-Assisted Recognition*, vol. 3584, Washington, DC, 1999, pp. 244-252.

Weyn, B. Computer Assisted Dfferenes Computer-Assisted Differential Diagnosis of Malignant Mesothelioma Based on Syntactic Structure Analysis, *Cytometry* 35:23-29 (1999).

Wirth M, Tyrrell C, Delaere K, et al. Bicalutamide ('Casodex') 150 mg in addition to standard care in patients with nonmetastatic prostate cancer: updated results from a randomised double-blind phase III study (median follow-up 5.1 y) in the early prostate cancer programme. Prostate Cancer Prostatic Dis (2005);8:194-200.

Yan, et al., "*Optimizing classifier performance via an approximation function to the Wilcoxon-mann-whitney statistic*, "Proc. Of 20th Intl Conf. Machine Learning, pp. 848-855, 2003.

Ye, Q.H., Qin, L.X., Forgues, M., He, P., Kim, J.W., Peng, A.C., Simon, R., Li, Y., Robles, A.I., Chen, Y., et al. 2003. Predicting hepatitis B virus-positive metastatic hepatocellular carcinomas using gene expression profiling and supervised machine learning. Nat Med 9:416-423.

Yeang, C.H., Ramaswamy, S., Tamayo, P., Mukherjee, S., Rifkin, R.M., Angelo, M., Reich, M., Lander, E., Mesirov, J., and Golub, T. 2001. Molecular classification of multiple tumor types. Bioinformatics 17 Suppl 1:S316-322.

Yeh W-C et al., <<Liver fibrosis grade classification with B-mode ultrasound>> Ultrasound in Medicine and Biology, New York, NY, US, vol. 29, No. 9 Sep. 2003, pp. 1229-1235.

Zhao, Tong, et al., "A novel scheme for abnormal cell detection in pap smear images," Proceedings of the Spie—The International Society for Optical Engineering SPIE-INT. Soc. Opt. Eng USA, vol. 5318, No. 1, Jul. 2004, pp. 151-162.

Zubek, V.B. et al. Machine Learning and Applications. Proceedings. Fourth Int'l Conference on Dec. 15-17, 2005. Digital Object Identifier 10.1109/ICMLA.2005.14 (6pages).

* cited by examiner

Figure 1: $R(\hat{t_i}, \hat{t_j})$ compares with $I(\hat{t_i}, \hat{t_j})$. The horizontal axis is $\hat{t_i} - \hat{t_j}$. $\gamma = 0.1$ and $n = 2$ in $R(\hat{t_i}, \hat{t_j})$.

Figure 2: The comparison of survival curves for the high-risk and low-risk patient groups between $NN_{ci}$ and $NN_{km}$. Note that the low risk group of $NN_{km}$ consists of 84 patients because of tied scores.

Figure 3: The comparison of survival curves for the high-risk and low-risk patient groups between $NN_{ci}$ and $NN_{ae}$.

Figure 4: The comparison of survival curves for the high-risk and low-risk patient groups between $NN_{ci}$ and $SVR_c$.

Figure 5: The comparison of survival curves for the high-risk and low-risk patient groups between $NN_{ci}$ and the Cox model.

Figure 6: A nomogram based on the score from the $NN_{ci}$ model.

METHODS AND SYSTEMS FOR PREDICTING OCCURRENCE OF AN EVENT

CLAIM TO PRIORITY RELATED APPLICATIONS

The present application is a continuation of U.S. patent application Ser. No. 11/067,066, filed Feb. 25, 2005, now U.S. Pat. No. 7,321,881 which claims priority under 35 U.S.C. §119(e) to U.S. provisional patent application No. 60/548,322, filed Feb. 27, 2004, and U.S. provisional patent application No. 60/577,051, filed Jun. 4, 2004, each disclosure of which is herein incorporated by reference.

FIELD OF THE INVENTION

Embodiments of the invention relate to event occurrence analysis and in particular eventual event occurrence analysis that can make use of both censored data and uncensored data for predicting a recurrence of a disease, for example, including cancer.

BACKGROUND OF THE INVENTION

There are many instances in which it is desirable to predict the likelihood of an event occurring within a certain amount of time or the amount of time until an event is likely to occur. Indeed, event prediction type data, including censored data, is one of the most common types of data used in bioscience (for example). Predicting the occurrence of an event can help people plan for the occurrence of the event. For example, it is desirable to predict the time to recurrence of diseases or other health issues, such as cancer, or environmental events (e.g., earthquakes, hurricanes).

Censored data comprises incomplete data in which it is unknown when an event occurred/recurred. For example, in training a model to predict the recurrence of cancer in a patient, the training data would preferably include censored data comprising patient data in which no recurrence of cancer came about in particular patients. This is because most medical data includes both censored and non-censored data, and increasing the amount of data available to train a predictive model can increase the reliability and predictive power of the model. Censored data indicates whether the outcome under observation, e.g., recurrence of cancer, has occurred (for example) within a patient's follow-up visit time: if the recurrence of cancer has not been observed at a patient's follow-up visit, this patient's data is censored. In predicting recurrence of cancer (in patients who have been considered cured, for example), data for many patients may be censored. Such censored observation provides incomplete information about the outcome, since the event may eventually occur after the follow-up visit, which should be taken into account by a predictive model. However, the current most accurate learning models, particularly machine learning techniques involving neural networks and support vector machines, do not make use of such censored data.

It would be highly desirable when training a predictive model to have as much data from as many sources as possible. Thus, for example, for disease related events, it is generally desirable to have data from as many patients as possible, and as much data from each patient as possible. With such data, however, come difficulties in how to process censored data.

Typically, traditional survival analysis, e.g., the Cox proportional hazards model, uses censored data. However, in general, the reliability of the Cox model deteriorates if the number of features is greater than the number of events divided by 10 or 20 [1]. For example, in one study included as an example for the present invention, the dataset consisted of only 130 patients, each of which was represented by a vector of 25 features. For such data, the Cox model could not be successfully derived from this dataset until the feature dimensionality was reduced.

Neural networks have been shown to be able to outperform traditional statistical models, due to neural networks' capacity to model nonlinearities. However, in order to be successful, a neural network typically requires a large number of samples in the training set. Generally, several approaches have been used in applying survival data in neural networks. One approach is to model the hazard or survival function as a neural network structure. For example, constructing the survival curve by a hazard function modeled by a neural network, for which the ith output is the estimated hazard at the discretized time interval i. Others have used the discretized time interval as an additional input to a neural network to model the survival probability. Still others have used several separately trained networks, each used to model the hazard function at a different time interval.

Still, in order to effectively use machine learning algorithms, treatment of censored data is crucial. Simply omitting the censored observations or treating them as non-recurring samples bias the resulting model and, thus, should be avoided. Kaplan-Meier estimates of event probability have been used as target values during training for patients who had short follow-up times and did not have the event recurred. Although this algorithm takes into account, to some extent, both follow-up time and censoring, it still fails to make complete use of available information. For instance, it treats two recurred patients as the same regardless of their survival time.

SUMMARY OF THE INVENTION

The present invention presents systems and methods to improve prediction of an occurrence of an event that may use both censored and non-censored data. The treatment of censored data in the present invention allows for the effective use of machine learning algorithms, e.g., neural networks, for the analysis of survival data to produce an effective predictive model, for example. In particular, some embodiments of the present invention may be used to indicate how likely an event will eventually occur.

In particular, some embodiments of the present invention are directed to supervised learning models which use an objective function to improve the predictive accuracy of the model. One such novel objective function may be an approximation of the concordance index (CI). Using an approximation to the CI allows the model to make use of the information from both censored and non-censored observations, thereby reducing event occurrence prediction into simpler predication/classification problem. Accordingly, such an approximation to the CI for the objective function may be a derivative of the CI.

Embodiments of the present invention have particular application to the prediction of the occurrence and, in particular, the recurrence of cancer after a patient has been initially cured (e.g., following removal and/or treatment of the cancer). Being able to make a more precise prediction on cancer recurrence allows for a more effective follow-up therapy to be administered to the patient. Accordingly, embodiments of the invention may be able to determine a prognostic estimate for an individual patient. Comparing embodiments of the present invention with the traditional Cox proportional hazards model (and several other algorithms based on neural networks and support vector machines, see below), the present invention may achieve improvement in being able to identify high-risk and low-risk groups of patients.

Accordingly, in a first group of embodiments of the present invention, a supervised model (e.g., predictive, prognostic) for a neural network is provided and may include one or more of the following components: a neural network having weighted connections, an input for receiving training data and an output, an error module for determining an error between output of the neural network and a desired output from the training data, an objective function for providing a rating of the performance of the model, the objective function comprising a function C substantially in accordance with a derivative of the concordance index and a training algorithm for adapting the weighted connections of the neural network in accordance with the results of the objective function. The input training data may include one or more features (clinical, molecular, image) for each of a plurality of known patients. Output data may include, for example, a predicitive or prognostic determination for each of the patients.

In a second group of embodiments of the invention, a method for predicting recurrence of cancer in a patient is provided and may comprise estimating the probability that cancer will recur within a shorter period of time in a patient with a higher prognostic score than a recurrence time in a patient with a lower prognostic score. Estimating may include conducting pair-wise comparisons between prognostic scores for patients i and j, using a neural network trained using an objective function comprising a function C substantially in accordance with a derivative of the concordance index.

In a third group of embodiments of the present invention, a method for training a neural network having weighted connections for classification of data is provided and may include inputting input training data into the neural network, processing, by the neural network, the input training data to produce an output, determining an error between the output and a desired output corresponding to the input training data, rating the performance neural network using an objective function, wherein the objective function comprises a function C substantially in accordance with a derivative of the concordance index and adapting the weighted connections of the neural network based upon results of the objective function.

In any of the above groups of embodiments, the function C may comprise $$C = \frac{\sum_{(i,j)\in\Omega} R(\hat{t}_i, \hat{t}_j)}{|\Omega|},$$

wherein $\Omega$ comprises pairs of data (i, j) meeting one or more predetermined conditions, or $$C = \frac{\sum_{(i,j)\in\Omega} -(\hat{t}_i - \hat{t}_j) \cdot R(\hat{t}_i - \hat{t}_j)}{D},$$

where $$D = \sum_{(i,j)\in\Omega} -(\hat{t}_i - \hat{t}_j),$$

may be a normalization factor, and $\Omega$ may comprise pairs of data (i, j) meeting one or more predetermined conditions. In the above equation, $t_i$ and $t_j$ represent estimates by the neural network of how long it will take for patients i and j to recur, respectively.

Moreover, any of the above groups of embodiments may be used, or modified to be used, to determine a prediction of the recurrence of disease (e.g., cancer). In such cases, the pairs of data may comprise patients {i, j} and the predetermined conditions may comprise at least: both patients i and j have experienced recurrence and the recurrence time $t_i$ of patient i is shorter than the recurrence time $t_j$ of patient j; or only patient i has experienced recurrence and $t_i$ is shorter than patient j's follow-up visit time $t_j$.

Other groups of embodiments may further include computer systems, computer readable media and computer application programs for carrying out any one or more of particular embodiments of the groups of embodiments listed above.

The present invention will become even clearer with reference to the attached figures, brief descriptions of which are provided below, and the following detailed description.

DETAILED DESCRIPTION OF THE EMBODIMENTS

Neural networks are a form of artificial intelligence which functions to imitate the way a human brain works. A neural network typically comprises a plurality of weighted, interconnected processing elements, to emulate neurons of a brain. The organization of the processing elements and the weights of the connections between the elements determine the output. Generally, neural networks may be effective for predicting events, but typically require large amounts of data to do so.

A supervised model (e.g., predictive, prognostic) for a neural network is used to train a neural network to solve particular problems, for example, to predict an occurrence of an event. The supervised learning model trains the neural network by providing it with inputs and desired outputs. These inputs and desired outputs are referred to as training data. The difference between what is actually output by the network and the desired output is then used by a training algorithm in the model to change the weights of the connections between the processing elements to obtain the desired output.

Figure 7:
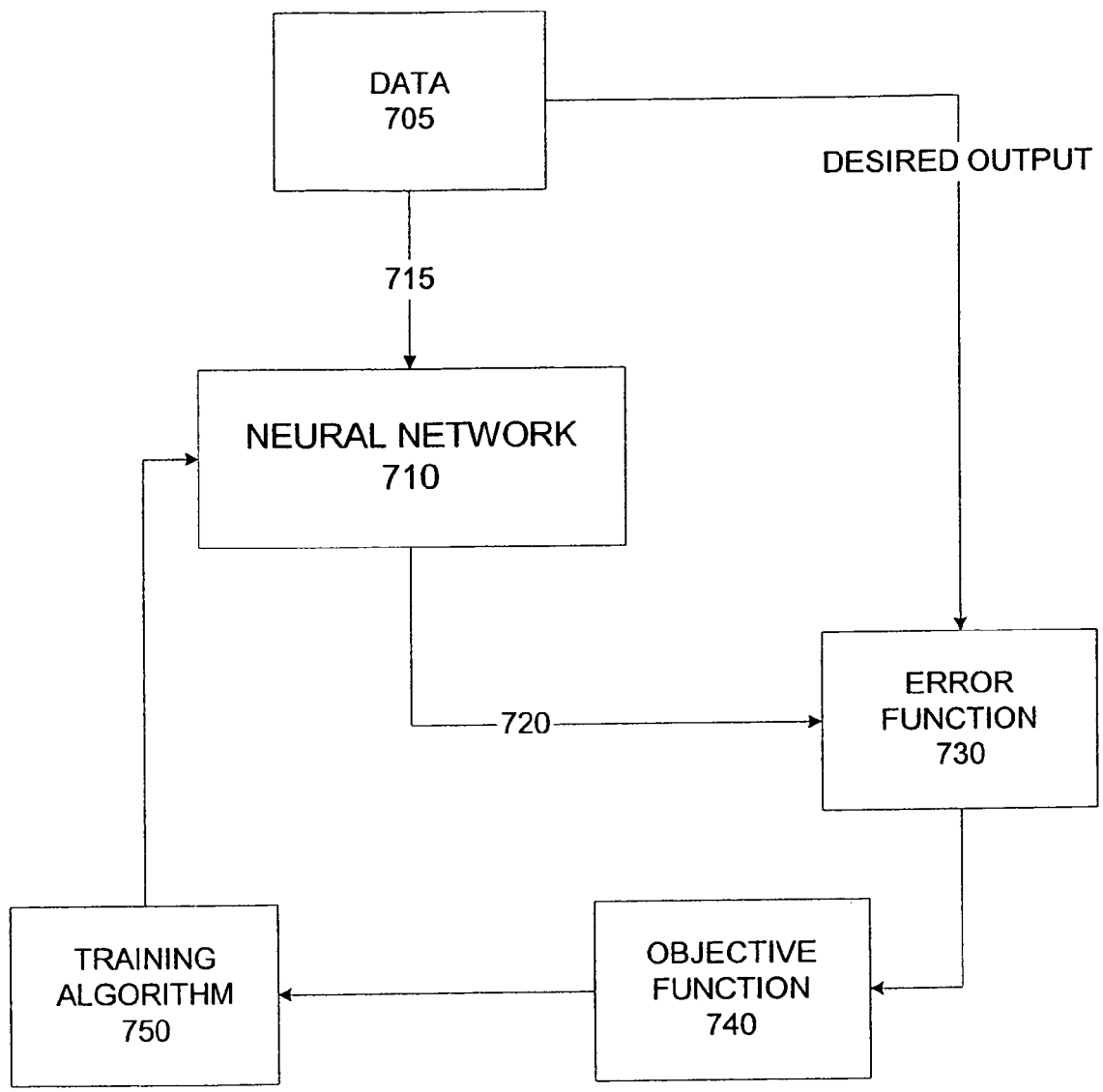
FIG. 7 is a general schematic of a supervised learning model for a neural network.

Thus, the goal of the training a neural network is to find a function that, when training input data is applied to it, yields the desired output for the given input from the training data. It can then be used to input data to seek output in accordance with the found function. As shown in FIG. 7, a supervised learning model 700 generally includes a neural network 710 having weighted connections, an input 715 for receiving training data 705 (input training data) and an output 720, an error function 730 for determining an error between output of the neural network and a desired output from the training data (output training data), an objective function 740 for providing a rating of the performance of the model, the objective function comprising a function C substantially in accordance with a derivative of the concordance index and a training algorithm 750 (i.e., optimization method) for adapting the weighted connections of the neural network in accordance with the results of the objective function.

Prediction of an Event: Cancer Recurrence Example

The present description is in reference to training a neural network using an objective function according to embodiment of the present invention. The neural network may comprise a typical multilayer perception (MLP) with softmax outputs and a single hidden layer and direct connection between the input and output layers. Please note, however, that the invention is not so limited to such a network, and may be applied to any neural network platform/arrangement.

Embodiments of the present invention enable improved prediction models by using an approximation (e.g., a derivative) of the concordance index (CI), as the objective function in training a neural network in a supervised learning model. Once trained, such models (and systems/methods which operate under such a model) may be used to estimate the probability that, of a pair of randomly chosen comparable patients, cancer will recur within a shorter period of time in one patient with a higher prognostic score than the other patient. In that regard, such use of a derivative of the CI as the objective function in supervised learning model during training allows such models to make use of the training information from both censored (event has not recurred) and non-censored (event has occurred) observations.

The Concordance Index

The concordance index may be expressed in the form:

$$CI = \frac{\sum_{(i,j)\in\Omega} I(\hat{t}_i, \hat{t}_j)}{|\Omega|}, \quad (1)$$

where $$I(\hat{t}_i, \hat{t}_j) = \begin{cases} 1 : \hat{t}_i > \hat{t}_j \\ 0 : \text{otherwise} \end{cases}, \quad (2)$$

and may be based on pair-wise comparisons between the prognostic estimates $\hat{t}_i$ and $\hat{t}_j$ for patients i and j, respectively. Here, $\Omega$ consists of all the pairs of patients $\{i,j\}$ who meet any of the following conditions:

both patients i and j experienced recurrence, and the recurrence time $t_i$ of patient i is shorter than patient j's recurrence time $t_j$; or only patient i experienced recurrence and $t_i$ is shorter than patient j's follow-up visit time $t_j$.

In other words, the numerator of the CI represents the number of times that the patient predicted to recur earlier by the neural network actually does recur earlier. The denominator is the total number of pairs of patients who meet the predetermined conditions.

Though the CI has long been used as a performance indicator for survival analysis, it has never been used as an objective function in a supervised learning model for a neural network to allow complete use of information from both censored and non-censored observations, as in embodiments of the present invention. The difficulty of using the CI as a training objective function in the past is that it is non-differentiable (i.e., the step function cannot be differentiated) and cannot be optimized by gradient-based methods. The present invention overcomes this obstacle by using an approximation of the CI as the objective function.

Figure 1:
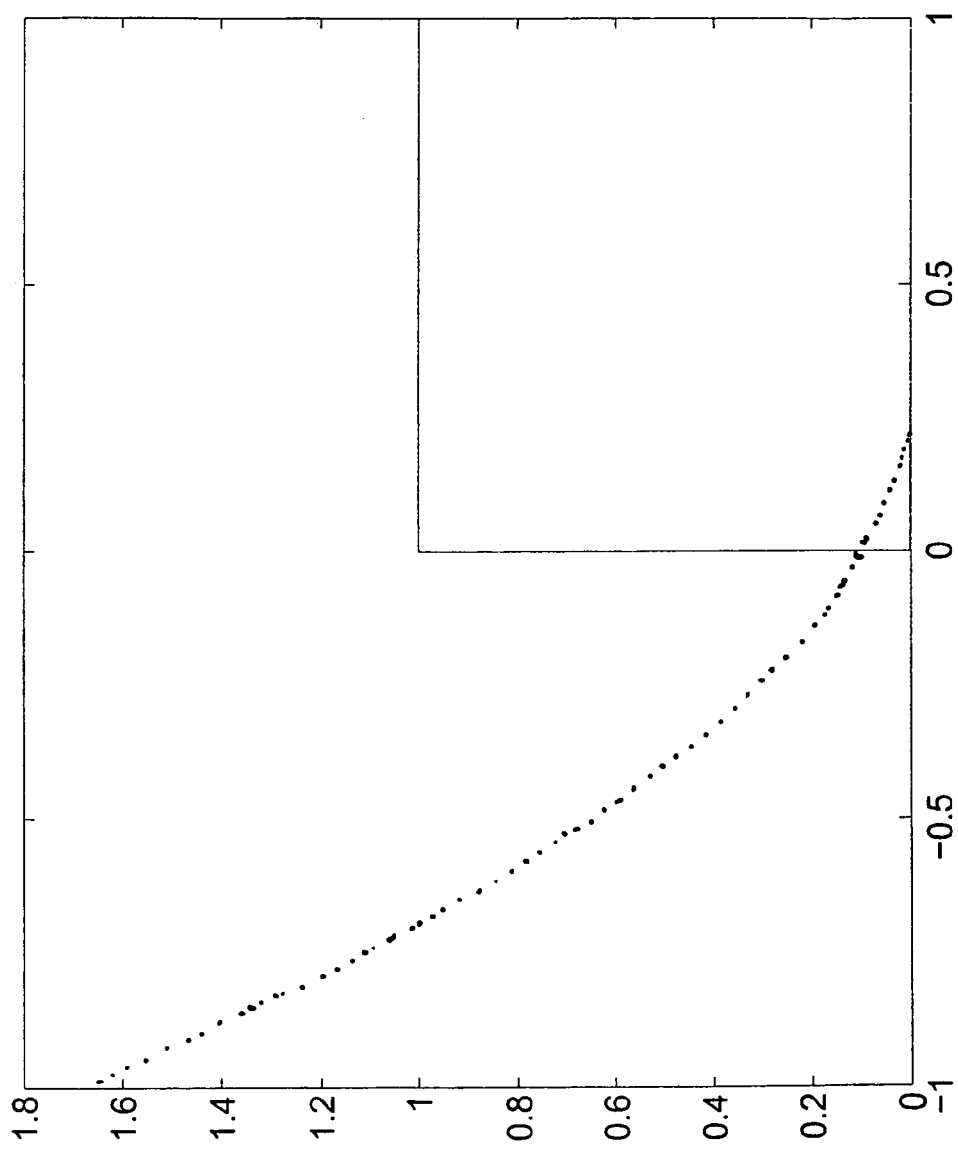
FIG. 1 is a chart illustrating a comparison of $R(\hat{t}_i,\hat{t}_j)$ with $I(\hat{t}_i,\hat{t}_j)$; the horizontal axis being $\hat{t}_i-\hat{t}_j$, $\gamma=0.1$ and n=2 in $R(\hat{t}_i,\hat{t}_j)$.
Figure 2:
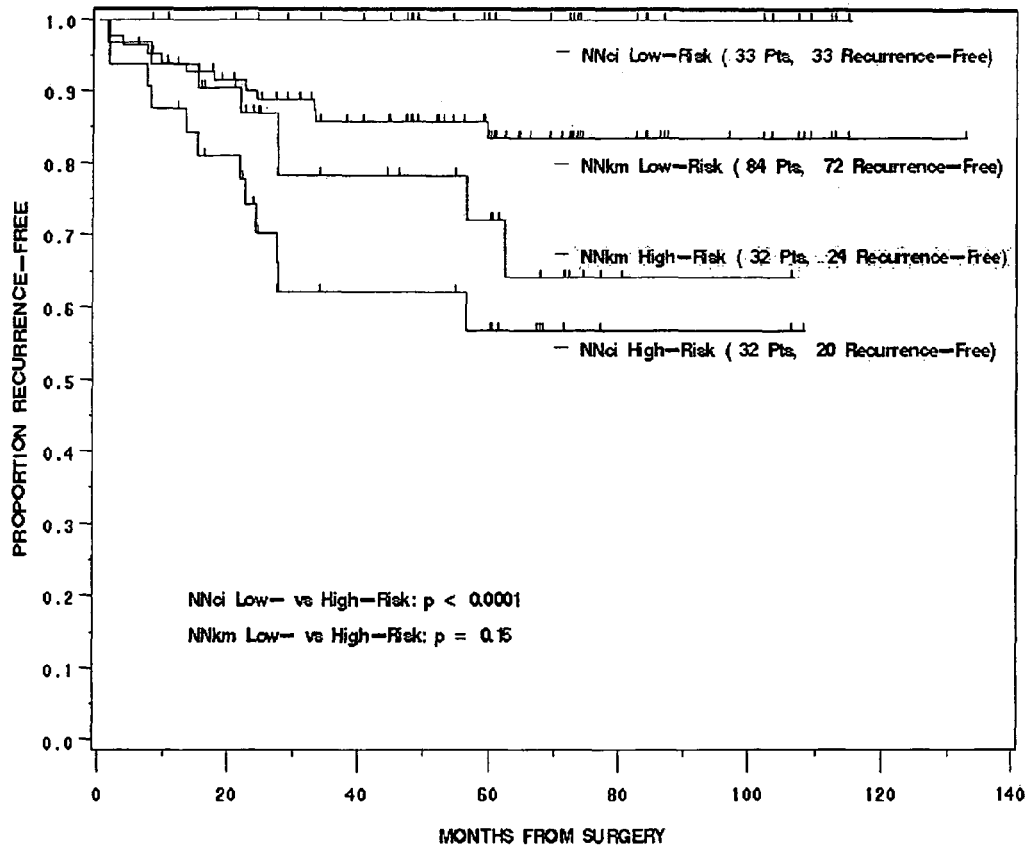
FIG. 2 is a chart illustrating a comparison of survival curves for high-risk and low-risk patient groups between $NN_{ci}$ and $NN_{km}$.
Figure 3:
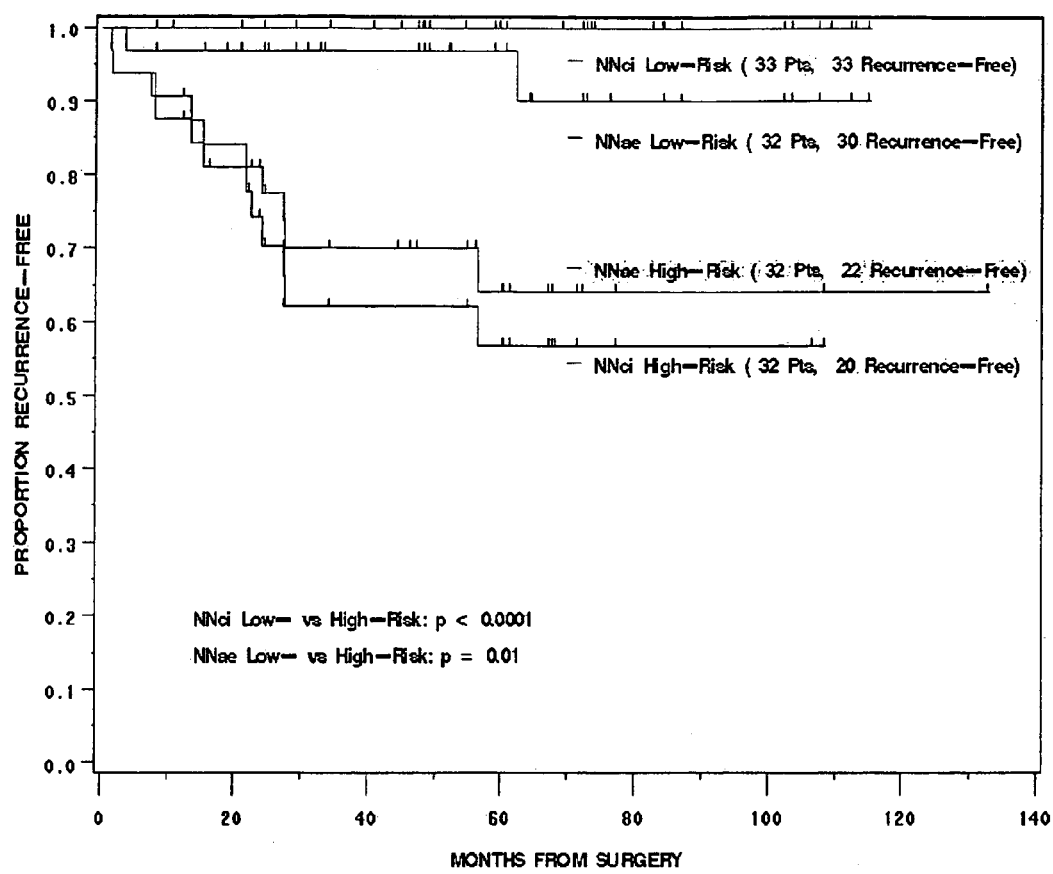
FIG. 3 is a chart illustrating a comparison of survival curves for high-risk and low-risk patient groups between $NN_{ci}$ and $NN_{ae}$.
Figure 4:
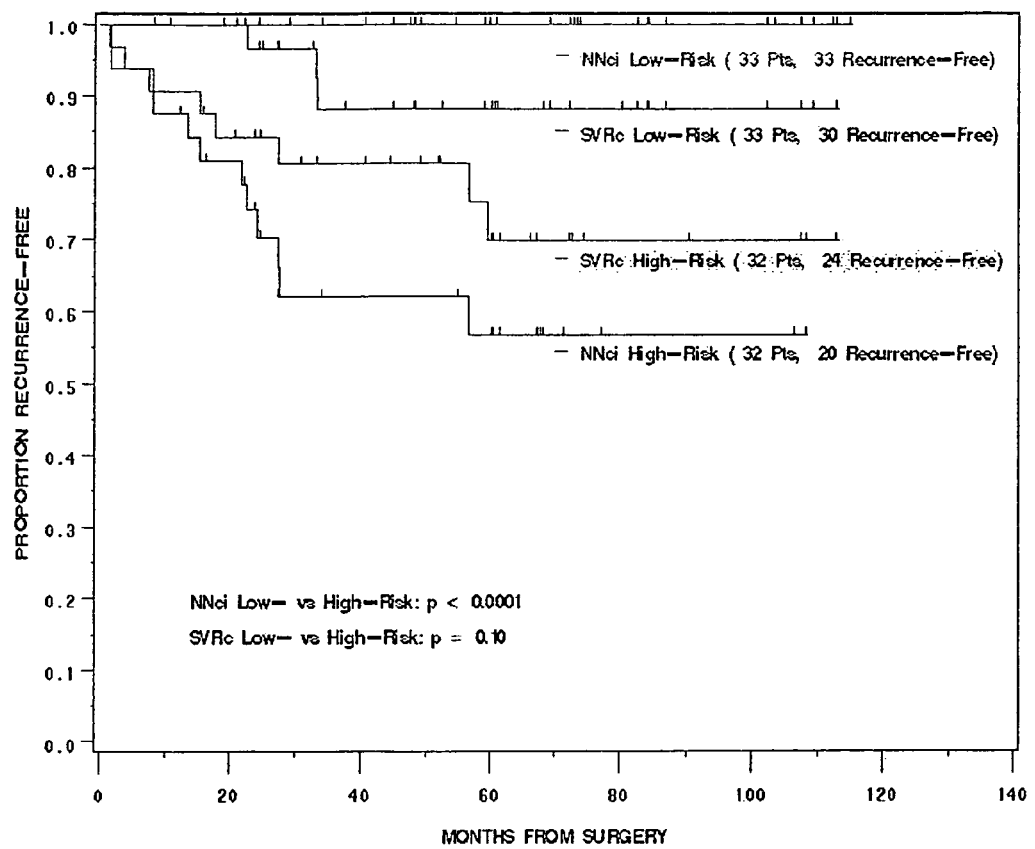
FIG. 4 is a chart illustrating a comparison of survival curves for high-risk and low-risk patient groups between $NN_{ci}$ and $SVR_c$.
Figure 5:
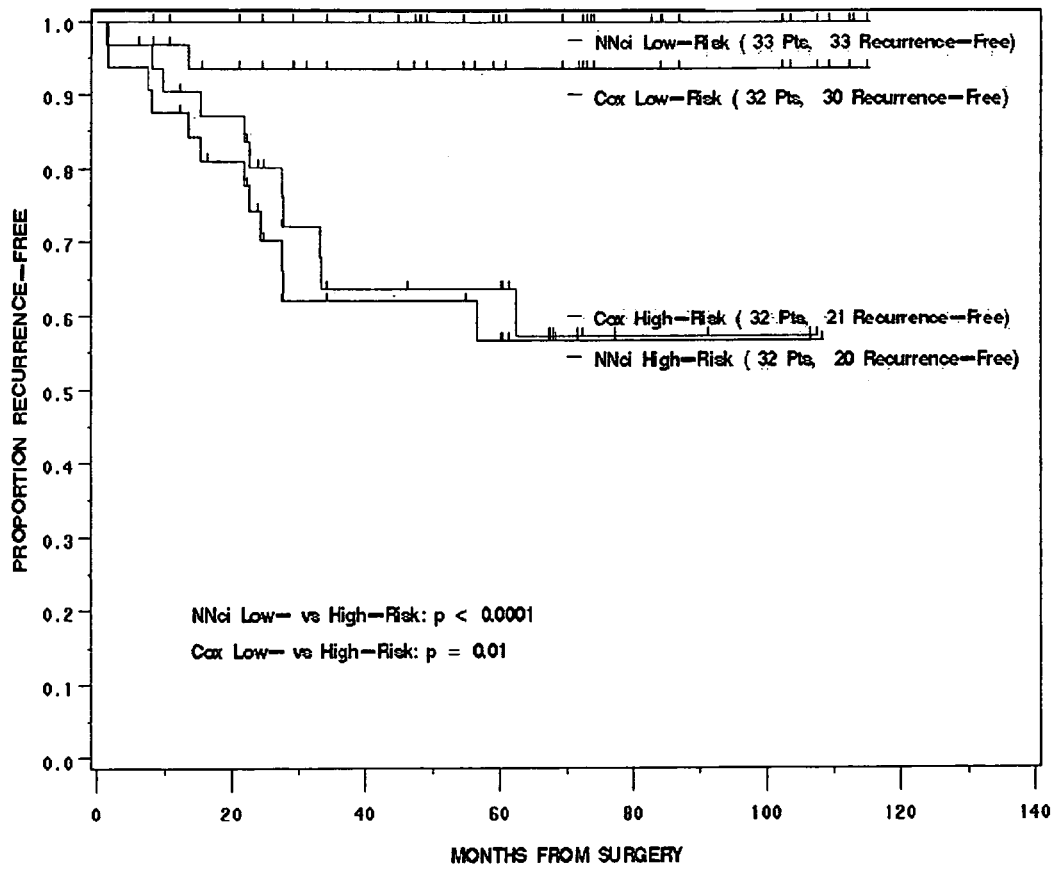
FIG. 5 is a chart illustrating a comparison of survival curves for high-risk and low-risk patient groups between $NN_{ci}$ and the Cox model.

As briefly stated above, the accuracy of a predictive model can be determined by using the CI: when the CI is maximized, the model is more accurate. Thus, by preferably substantially maximizing the CI, the performance of a model is maximized. Accordingly, a differentiable approximation to the step function in Eq. (2) has been proposed in [2] to directly optimize the AUC. In [2], several alternative approximations to eq. 2 are discussed in the context of approximating the Wilicoxon-Mann-Whitney statistic, which is different from the concordance index [3]. An intuitive choice of the discussed approximations is the sigmoid function:

$$S(\hat{t}_i, \hat{t}_j) = \frac{1}{1 + e^{-\beta(\hat{t}_i - \hat{t}_j)}}, \quad (4)$$

where $\beta>0$. However, this is found to be less effective than the following function:

$$R(\hat{t}_i, \hat{t}_j) = \begin{cases} (-(\hat{t}_i - \hat{t}_j - \gamma))^n : \hat{t}_i - \hat{t}_j < \gamma \\ 0 : \text{otherwise} \end{cases}, \quad (5)$$

where $0\leq\gamma\leq1$ and $n>1$. $R(\hat{t}_i,\hat{t}_j)$ can be regarded as an approximation to $I(-\hat{t}_i,-\hat{t}_j)$. An example of $R(\hat{t}_i,\hat{t}_j)$ with $I(\hat{t}_i,\hat{t}_j)$ is shown in FIG. 1. Thus, in order to maximize the CI in Eq. (1), a prognostic model is trained by minimizing the objective function:

$$C = \frac{\sum_{(i,j)\in\Omega} R(\hat{t}_i, \hat{t}_j)}{|\Omega|}. \quad (6)$$

Empirically, it has been found that a weighted version of C in the following form, according to some embodiments, achieves improved results:

$$C\omega = \frac{\sum_{(i,j)\in\Omega} -(\hat{t}_i - \hat{t}_j) \cdot R(\hat{t}_i, \hat{t}_j)}{D}, \quad (7)$$

where $$D = \sum_{(i,j)\in\Omega} -(\hat{t}_i - \hat{t}_j), \quad (8)$$

is the normalization factor. Here each $R(\hat{t}_i,\hat{t}_j)$ is weighted by the difference between $\hat{t}_i$ and $\hat{t}_j$. The process of minimizing the $C_\omega$ (or C) seeks to move each pair of samples in $\Omega$ to satisfy $\hat{t}_i-\hat{t}_j>\gamma$ and thus to make $I(\hat{t}_i,\hat{t}_j)=1$ in Eq. (1).

When the difference between the outputs of a pair in $\Omega$ is larger than the margin $\gamma$, this pair of samples will stop contributing to the objective function. This mechanism effectively overcomes over-fitting of the data during training of the model and makes the optimization preferably focus on only moving more pairs of samples in Ω to satisfy $\hat{t}_i - \hat{t}_j > \gamma$. The influence of the training samples is adaptively adjusted according to the pair-wise comparisons during training. Note that the positive margin γ in R is preferable for improved generalization performance. In other words, the parameters of the neural network are adjusted during training by calculating the CI after all the patient data has been entered. The neural network then adjusts the parameters with the goal of minimizing the objective function and thus maximizing the CI. As used above, over-fitting generally refers to the complexity of the neural network. Specifically, if the network is too complex, the network will react to "noisy" data. Overfitting is risky in that it can easily lead to predictions that are far beyond the range of the training data.

Embodiments of the present invention, described above and further explained with reference to the example below, allow a supervised learning model to make complete use of information (censored and non-censored data) from survival data (for example) using a derivative of the CI as the objective function in training the neural network. Using embodiments of the present invention, improvement may be achieved in identifying high-risk and low-risk groups of patients in a cancer recurrence predictive model (for example). Moreover, embodiments of the present invention may be applicable for use in the approximation in a more general problem of learning ranks, where an objective function based on a step function can be formed.

The above description and example given below is considered as illustrative only of the principles of the various embodiments of the invention. Further, since numerous modifications and changes will readily occur to those skilled in the art, the invention is not limited to the exact construction and operation shown and described, and accordingly, all suitable modifications and equivalents may be resorted to, falling within the scope of the invention.

Prostate Cancer Study

Prostate cancer (PCa) is a malignant tumor that usually begins in the outer-most part of the prostate and is the most common form of cancer found in American men. More than 180,000 men in the U.S. will be diagnosed with prostate cancer this year, and more than 30,000 will die of the disease. While the number of men diagnosed with prostate cancer remains high, survival rates have been steadily improving primarily due to early detection. Eighty-nine percent of the men diagnosed with the disease will survive at least five years, while 63% will survive 10 years or longer.

The American Urological Association and the American Cancer Society recommend annual screening for men ages 50 to 70. The most effective screening tests available include a blood test for an enzyme called prostate-specific antigen (PSA) which is produced by the prostate gland and the employment of a digital rectal exam (DRE). Elevated PSA levels (>4 ng/ml or greater) may indicate prostate cancer. However, increases in PSA are also reported in benign conditions such as prostatitis and a pathologic enlargement of the prostate known as benign proliferative hyperplasia (BPH). The standard of care once PCa is suspected is to obtain a biopsy, typically a sextant (six-part) biopsy to assess presence or absence of disease.

The most common treatment for localized or confined PCa, in men under the age 70 who do not have other health complications is a radical prostatectomy, i.e., surgery to remove the prostate gland, seminal vesicles, vas deferens and some surrounding tissue. After surgery, the PSA levels in the blood should be reduced to 0.2 ng/ml or less. If the PSA levels begin to rise at any time after treatment (also known as a biochemical recurrence BCR), a local or distant recurrence may be suspected, and will necessitate restaging the cancer, as well as a discussion of possible salvage therapies with the patient including radiation or hormonal therapy, experimental protocols or observation [4].

Thus, the ability to predict which patients will have a BCR would be very important to urologists and oncologists in managing the course of future treatment. A number of prostate cancer nomograms which combine clinical and/or pathologic factors to predict an individual patients probability of disease recurrence or survival have been published, e.g., [5] [6] [7]. The postoperative nomogram developed by Kattan et al. [5] is widely used by clinicians and allows a prediction of the probability of disease recurrence for patients who have received radical prostatectomy as treatment for prostate cancer.

The postoperative nomogram used Cox proportional hazards regression analysis to model the clinical and pathologic data and disease follow-up for men treated with radical prostatectomy by a single surgeon. Prognostic variables included pretreatment serum prostate-specific antigen level, radical prostatectomy Gleason sum, prostatic capsular invasion, surgical margin status, seminal vesicle invasion, and lymph node status. Treatment failure was recorded when there was clinical evidence of disease recurrence, a rising serum prostate-specific antigen level, or initiation of adjuvant therapy.

Despite the widespread use of the postoperative nomogram and its reasonable predictive accuracy, better tools are needed to predict an individual patients probability of disease recurrence after radical prostatectomy. Systems pathology or biology is a new discipline that is positioned to significantly impact biological discovery processes. This emerging approach attempts to facilitate discovery by systematic integration of technologies, gathering information at multiple levels (instead of only one) and examining complex interactions which results in a superior output of data and information, thereby enhancing our understanding of biological function and chemico-biological interactions [8].

The number of features generated by these technologies can be larger than standard survival methods can handle. Thus, the underlying hypothesis of this study is that an improved predictive model for disease recurrence after radical prostatectomy can be derived from a novel integrated or systems pathology approach, that will use neural networks to handle the expanded multidimensional sources of data input, including clinical and pathological variables (variables used in original nomogram plus additional clinical variables). Molecular biomarker data can also be derived for use from IHC analyses of tissue microarrays, as well as results of machine vision image analysis which quantitate histopathological features of H&E slides.

It has been found that clinical, histopathological, immunohistochemical (IHC), and bio-imaging data can be used to predict prostate cancer BCR. In order to achieve this objective, a cohort of 539 patients who underwent radical prostatectomy at a single hospital in the US was studied. 16 clinical and histopathological features were collected, which include patient age, race, Gleason grade and score, and other pre- and post-operative parameters. In addition, high-density tissue microarrays (TMAs) were constructed from the patients' prostatectomy specimens. A single hematoxylin and eosin-stained (H&E) slide for each patient was used for image analysis, while the remaining sections made from the paraffin-embedded tissue blocks were used to conduct IHC studies of selected biomarkers in the laboratory. Data generated by the IHC studies included the number of cells which stained positive for a particular biomarker, if any, and the level of intensity at which the cell(s) stained positive for the biomarker. 43 IHC features from 12 biomarkers were obtained and studied. Images of the H&E slides were captured via a light microscope at 20× magnification using a SPOT Insight QE Color Digital Camera (KAI2000).

Using a proprietary image analysis system, pathologically meaningful objects were identified and various statistical features associated with these objects were generated. Such objects include spectral-based characteristics (channel means, standard deviations, etc.), position, size, perimeter, shape (asymmetry, compactness, elliptic fit, etc.), and relationships to neighboring objects (contrast). In the end, 496 bio-imaging features were produced.

This study was restricted to those patients who had non-missing data for each of the above three domains (clinical and histopathological, IHC, and bioimaging). Thus, the effective sample size consisted of only 130 patients. For these patients, the time from the surgery to the most recent follow-up visit ranged from 1 month to 133 months. Patients who had measurable prostate-specific antigen (PSA) at this visit were considered to have recurrent prostate cancer. If a patient did not recur as of this last visit, or the patient outcome was unknown as of their most recent visit (e.g. due to loss to follow-up), then the patient outcome was considered censored, specifically right-censored.

Twenty (20) patients experienced PSA recurrence among the 130 patients, while the remaining patients were censored. Thus, the available sample was very small and heavily censored. By consulting domain experts and using an in-house domain specific feature selection procedure, which combines greedy forward selection and backward elimination based on the relevant importance of feature groups given by domain experts, the final feature set was reduced to 25 features.

The new training algorithm/model according to embodiments of the present invention, denoted as $NN_{ci}$, was compared with four other algorithms over the data collected. The first compared model used an algorithm based on the Kaplan-Meier estimate of recurrence probability, and is used as the target value for the patients who had short follow-up times and did not experience recurrence. The MLP network trained by this algorithm will be referred to as $NN_{km}$. The patients who had follow-up times longer than 7 years and remained disease free are assumed to be successfully cured and a target value of 0 is assigned to such patients. Those patients who had recurrence at the follow-up visit have a target value of 1. Like the new algorithm of the present invention, this model should output a higher score for a higher-risk patient.

The second compared model uses an algorithm that trains an MLP model to regress over the survival/censoring time. It uses an asymmetric squared error function for the censored patients, which becomes zero when the model output is larger than the censoring time. This model is referred to as $NN_{ae}$. Unlike $NN_{ci}$ and $NN_{km}$, a higher-risk patient should have a lower score, an estimate proportional to the survival time, in this model.

In addition, the new training model is compared to a support vector machine regressor with an asymmetric penalty function, which incurs a smaller penalty when the model output is larger than the target value (survival time) and a larger penalty when the output is smaller than the target value. This model is referred to as $SVR_c$, and should output a higher score for a lower-risk patient.

A last model compared to the present invention is the Cox proportional hazard model. The Cox model outputs a prognostic hazard score, which is a function of a linear combination of the covariates (input features). The higher the score is, the more risk the model predicts the patient would have.

The empirical results are based on leave-one-out cross-validation. For all models, model selection was conducted based on cross-validation over the training data for fold 1, and the same model setting was used for all the folds. Generally, a fold is a partition of an original dataset. For example, if the original dataset had only 10 patients and a leave-one-out cross-validation was performed, there would be 10 folds of size 1 where one patient is excluded for testing and the other 9 for training. As another example, 5 folds of size 2 are present in 5-fold cross-validation of 10 patients. All the neural networks based models have 5 hidden units after the model selection. For $NN_{ci}$, γ was chosen to be 0.01. It has been found that the results in terms of the CI value are more sensitive to γ than the AUC metric. n is typically set as 3. The RBF kernel is used in SVRc. To obtain a Cox model, the number of covariates was reduced to 23, since the dataset was too small (i.e., the number of event/recurrences in the dataset was too small to handle the number of variables in question).

The performance is measured in two ways. The first measure is the Concordance Index, which evaluates the model's general predictive accuracy for estimating the probability that a patient with the higher prognostic score will recur within a shorter time than a patient with a lower score. Table 1 (below) shows the Concordance Index values for all the models. Not surprisingly, the new model according to embodiments of the present invention, $NN_{ci}$, achieved the largest CI value over the cross validation results.

| $NN_{ci}$ | $NN_{km}$ | $NN_{ae}$ | $SVR_c$ | Cox |
| --- | --- | --- | --- | --- |
| 0.8178 | 0.5411 | 0.7375 | 0.6206 | 0.7037 |

The survival curves for both the predicted high-risk and low-risk patients are shown in FIGS. 2 to 5 for all the models. Survival curves are constructed for both high-risk and low-risk patients by Kaplan-Meier estimates based on the scores from each model. In each figure, the new model is shown with one of the four other models. A sign of a model successfully distinguishing between the high risk and low risk patient groups is the distance that the high-risk and low-risk survival curves are apart—the farther apart the two curves are, the more successful the model is at distinguishing between the two groups. As is evident in these figures, the high-risk and low-risk survival curves are farthest apart for the $NN_{ci}$ model, indicating a more successful model than the comparison models.

For $NN_{ci}$, $NN_{km}$, and the Cox model, the high-risk group is defined as the patients in the highest quartile of the scores, and the low-risk group consists of the patients in the lowest quartile of the scores. However, for both $NN_{ae}$ and $SVR_c$, the high-risk patients are in the lowest quartile of the scores, and the low-risk patients fall in the highest quartile of the scores. A log-rank test [9] was also conducted for each pair of survival curves of high-risk and low-risk groups within each model, with a "p" value indicating the ability of the model to accurately distinguish high-risk and low-risk patient groups—the lower the p value, the better the ability of the model to distinguish between the two groups.

Table 2 summarizes the p values for all the methods. As shown, the p value for the new model $NN_{ci}$ is much smaller (<0.0001) than all the other models, giving further evidence of the new model's improvement in identifying high-risk and low-risk patient groups.

| $NN_{ci}$ | $NN_{km}$ | $NN_{ae}$ | $SVR_c$ | Cox |
|---|---|---|---|---|
| <0.0001 | 0.15 | 0.01 | 0.10 | 0.01 |

Recalibration

Figure 6:
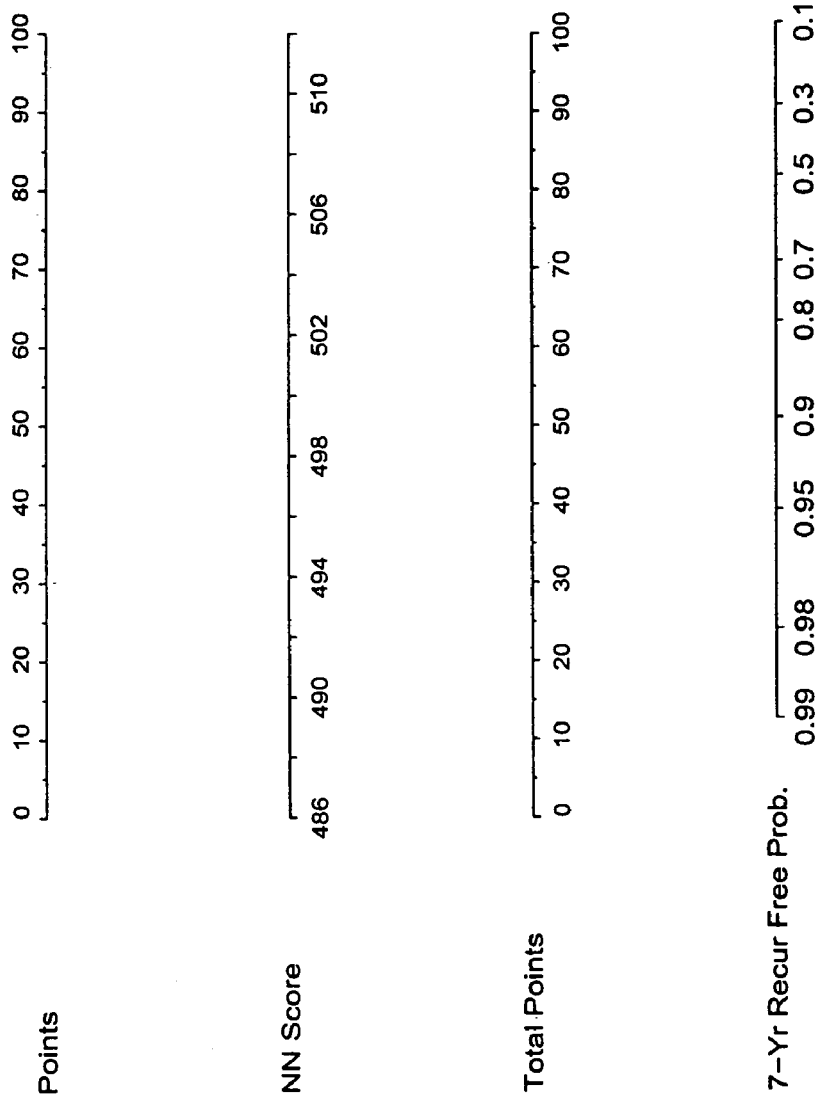
FIG. 6 is a nomogram based on the score from the $NN_{ci}$ model.

In order to make the score from the model have a clinically meaningful interpretation, the scores may be recalibrated to probabilities of remaining free of cancer recurrence in the next 7 years following surgery. The probability is estimated using the cumulative hazard function, also known as the Nelson-Aalen estimator. The Nelson-Aalen estimator incorporates both the baseline hazard rate and the hazard function, estimated via partial likelihood maximization using the Newton-Raphson method [10]. Based on these probability estimates, a nomogram was generated which is shown in FIG. 6. For ease of use, the original scores from the model are multiplied by 1000 in this nomogram.

To use the nomogram, a straight line is drawn up to the points axis from a patients NN score to determine how many points toward recurrence the patient received. This process is repeated for each feature, and the points added together to equal the Total Points. In the example illustrated in FIG. 6, with a single feature, which is the NN score, the Points and Total Points axes are identical. Accordingly, a straight line would be drawn down from the Total Points axis to the corresponding probability of the patient remaining recurrence-free for 7 years following the surgery, assuming the patient does not die of another cause first.

REFERENCES

The following references are all hereby incorporated by reference herein in their entireties.

1. F. E. Harrell. *Regression Modeling Strategies with Applications to Linear Models, Logistic Regression, and Survival Analysis*. Springer, New York, 2001.
2. L. Yan et al., "Optimizing classifier performance via an approximation function to the Wilcoxon-mann-whitney statistic," *Proc. of 20th Int'l Conf. Machine Learning*, pages 848-855, 2003.
3. F. E. Harrell, Regression Modeling Strategies, Springer-Verlag 2001, pp. 247 and 493.
4. H. Gronberg. Prostate cancer epidemiology. *Lancet*, 361: 859-864, 2003.
5. M. W. Kattan, T. M. Wheeler, and P. T. Scardino. Postoperative nomogram for disease recurrence after radical prostatectomy for prostate cancer. *Journal of Clin Oncol*, 17:1499-1507, 1999.
6. M. Graefen, P. I. Karakiewicz, I. Cagiannos, and et al. Validation study of the accuracy of a postoperative nomogram for recurrence after radical prostatectomy for localized prostate cancer. Journal of Clin Oncol, 20:951-956, 2002.
7. L. Hood. Systems biology: integrating technology, biology, and computation. *Mech Ageing Dev*, 124:9-16, 2003.
8. E. Davidov, J. Holland, E. Marple, and S. Naylor. Advancing drug discovery through systems biology. *Drug Discov Today*, 8:175-183, 2003.
9. J. D. Kalbfleisch and R. L. Prentice. *The Statistical Analysis of Failure Time Data*. John Wiley & Sons, New York, 1980.
10. J. P. Klein and M. L. Moeschberger. *Survival Analysis: Techniques for Censored and Truncated Data*. Springer, New York, 1997.

What is claimed is:

1. Apparatus for predicting occurrence of a medical condition in a patient under consideration comprising:

a neural network having weighted connections, an input and an output, said weighted connections resulting from training said neural network;

wherein said input is configured to receive data for said patient under consideration and, based on said weighted connections, said neural network is configured to provide at said output a prognostic indicator of the risk of occurrence of the medical condition in said patient; and wherein said neural network is trained with an objective function C for providing a rating of the performance of the neural network, wherein the objective function C is a differentiable approximation of the concordance index, said training of said neural network with the objective function C comprising conducting pair-wise comparisons between prognostic indicators from said neural network of pairs of patients i and j from a training dataset comprising both censored and non-censored data and adapting said weighted connections of said neural network as a result of said comparisons, said pairs of patients from said training dataset comprising:

patients i and j who have both experienced the medical condition, and the time $t_i$ to occurrence of the medical condition of patient i is shorter than the time $t_j$ to occurrence of the medical condition of patient j; and patients i and j where only patient i has experienced the medical condition, and the time $t_i$ to occurrence of the medical condition in patient i is shorter than a follow-up visit time $t_j$ for patient j.

2. The apparatus according to claim 1, wherein said neural network is configured to receive at said input data for said patient under consideration comprising clinical data, molecular biomarker data, and histopathological data resulting from machine vision analysis of tissue, and based on said weighted connections, to provide at said output said prognostic indicator for said patient.

3. The apparatus according to claim 1, wherein said medical condition comprises recurrence of prostate cancer and said prognostic indicator indicates a likelihood of recurrence of prostate cancer in said patient under consideration within a certain amount of time.

4. The apparatus according to claim 1, wherein the function C is defined according to $$C = \frac{\sum_{(i,j)\in\Omega} R(\hat{t}_i, \hat{t}_j)}{|\Omega|},$$

wherein $\Omega$ comprises said pairs of patients (i, j), wherein R is defined according to $$R(\hat{t}_i, \hat{t}_j) = \begin{cases} (-(\hat{t}_i - \hat{t}_j - \gamma))^n : \hat{t}_i - \hat{t}_j < \gamma \\ 0 : \text{otherwise} \end{cases},$$

wherein $\hat{t}_i$ and $\hat{t}_j$ include prognostic estimates for patients i and j, respectively, and wherein $0<\gamma<1$ and $n>1$.

5. The apparatus according to claim 1, wherein the function C is defined according to $$C_\omega = \frac{\sum_{(i,j)\in\Omega} -(\hat{t}_i - \hat{t}_j) \cdot R(\hat{t}_i, \hat{t}_j)}{D},$$

wherein $$D = \sum_{(i,j)\in\Omega} -(\hat{t}_i - \hat{t}_j)$$

is a normalization factor, and $\Omega$ comprises said pairs of patients (i, j), wherein R is defined according to $$R(\hat{t}_i, \hat{t}_j) = \begin{cases} (-(\hat{t}_i - \hat{t}_j - \gamma))^n : \hat{t}_i - \hat{t}_j < \gamma \\ 0 : \text{otherwise} \end{cases},$$

wherein $\hat{t}_i$ and $\hat{t}_j$ include prognostic estimates for patients i and j, respectively, and wherein $0<\gamma<1$ and $n>1$.

6. The apparatus according to claim 1, wherein said medical condition comprises recurrence of prostate cancer and said prognostic indicator indicates an amount of time in which recurrence of prostate cancer in said patient under consideration is likely to occur.

7. A method for predicting occurrence of a medical condition in a patient under consideration:
    inputting data into a neural network having weighted connections in order to produce an output, said weighted connections resulting from training said neural network;
    wherein said inputting data comprises inputting data for said patient under consideration and said output comprises a prognostic indicator indicative of the risk of occurrence of the medical condition in said patient; and
    wherein said training said neural network comprises training said neural network with an objective function C that provides a rating of the performance of the neural network, wherein the objective function C is a differentiable approximation of the concordance index, said training of said neural network with the objective function C comprising conducting pair-wise comparisons between prognostic indicators from said neural network of pairs of patients i and j from a training dataset comprising both censored and non-censored data and adapting said weighted connections of said neural network as a result of said comparisons, said pairs of patients from said training dataset comprising:
        patients i and j who have both experienced the medical condition and the time $t_i$ to occurrence of the medical condition of patient i is shorter than the time $t_j$ to occurrence of the medical condition of patient j; and
        patients i and j where only patient i has experienced the medical condition and the time $t_j$ to occurrence of the medical condition in patient i is shorter than a follow-up visit time $t_j$ for patient j.

8. The method according to claim 7, wherein said inputting data for said patient under consideration comprises inputting data for said patient comprising clinical data, molecular biomarker data, and histopathological data resulting from machine vision analysis of tissue, and based on said weighted connections, outputting said prognostic indicator for said patient.

9. The method according to claim 7, wherein said medical condition comprises recurrence of prostate cancer and the prognostic indicator is indicative of a likelihood of recurrence of prostate cancer in said patient under consideration within a certain amount of time.

10. The method according to claim 7, wherein the function C is defined according to $$C = \frac{\sum_{(i,j)\in\Omega} R(\hat{t}_i, \hat{t}_j)}{|\Omega|},$$

and wherein $\Omega$ comprises said pairs of patients (i, j) wherein R is defined according to $$R(\hat{t}_i, \hat{t}_j) = \begin{cases} (-(\hat{t}_i - \hat{t}_j - \gamma))^n : \hat{t}_i - \hat{t}_j < \gamma \\ 0 : \text{otherwise} \end{cases},$$

wherein $\hat{t}_i$ and $\hat{t}_j$ include prognostic estimates for patients i and j, respectively, and wherein $0<\gamma<1$ and $n>1$.

11. The method according to claim 7, wherein the function C is defined according to:

$$C_\omega = \frac{\sum_{(i,j)\in\Omega} -(\hat{t}_i - \hat{t}_j) \cdot R(\hat{t}_i, \hat{t}_j)}{D},$$

wherein $$D = \sum_{(i,j)\in\Omega} -(\hat{t}_i - \hat{t}_j)$$

is a normalization factor, and wherein $\Omega$ comprises said pairs of patients (i, j), wherein R is defined according to $$R(\hat{t}_i, \hat{t}_j) = \begin{cases} (-(\hat{t}_i - \hat{t}_j - \gamma))^n : \hat{t}_i - \hat{t}_j < \gamma \\ 0 : \text{otherwise} \end{cases},$$

wherein $\hat{t}_i$ and $\hat{t}_j$ include prognostic estimates for patients i and j, respectively, and wherein $0<\gamma<1$ and $n>1$.

12. The method according to claim 7, wherein said medical condition comprises recurrence of prostate cancer and outputting said prognostic indicator comprises outputting a prognostic indicator indicative of an amount of time in which recurrence of prostate cancer in said patient under consideration is likely to occur.

13. Computer readable media comprising computer instructions for causing a computer to perform the method comprising:
    inputting data into a neural network having weighted connections in order to produce an output, said weighted connections resulting from training said neural network;
    wherein said inputting data comprises inputting data for said patient under consideration and said output comprises a prognostic indicator indicative of the risk of occurrence of the medical condition in said patient; and
    wherein said training said neural network comprises training said neural network with an objective function C that provides a rating of the performance of the neural network, wherein the objective function C is an differentiable approximation of the concordance index, said training of said neural network with the objective function C comprising conducting pair-wise comparisons between prognostic indicators from said neural network of pairs of patients i and j from a training dataset comprising both censored and non-censored data and adapting said weighted connections of said neural network as a result of said comparisons, said pairs of patients from said training dataset comprising:

patients i and j who have both experienced the medical condition and the time $t_i$ to occurrence of the medical condition of patient i is shorter than the time $t_j$ to occurrence of the medical condition of patient j; and patients i and j where only patient i has experienced the medical condition and the time $t_i$ to occurrence of the medical condition in patient i is shorter than a follow-up visit time $t_j$ for patient j.

14. The computer readable media according to claim 13, wherein said inputting data for said patient under consideration comprises inputting data for said patient comprising clinical data, molecular biomarker data, and histopathological data resulting from machine vision analysis of tissue, and based on said weighted connections, outputting said prognostic indicator for said patient.

15. The computer readable media according to claim 13, wherein said medical condition comprises recurrence of prostate cancer and outputting said prognostic indicator comprises outputting a prognostic indicator indicative of a likelihood of recurrence of prostate cancer in said patient under consideration within a certain amount of time.

16. The computer readable media according to claim 13, wherein the function C is defined according to $$C = \frac{\sum_{(i,j)\in\Omega} R(\hat{t}_i, \hat{t}_j)}{|\Omega|},$$

and wherein $\Omega$ comprises said pairs of patients (i, j), wherein R is defined according to $$R(\hat{t}_i, \hat{t}_j) = \begin{cases} (-(\hat{t}_i - \hat{t}_j - \gamma))^n : \hat{t}_i - \hat{t}_j < \gamma \\ 0 : \text{otherwise} \end{cases},$$

wherein $\hat{t}_i$ and $\hat{t}_j$ include prognostic estimates for the patients i and j, respectively, and wherein $0 < \gamma < 1$ and $n > 1$.

17. The computer readable media according to claim 13, wherein the function C is defined according to:

$$C_\omega = \frac{\sum_{(i,j)\in\Omega} -(\hat{t}_i - \hat{t}_j) \cdot R(\hat{t}_i, \hat{t}_j)}{D},$$

wherein $$D = \sum_{(i,j)\in\Omega} -(\hat{t}_i - \hat{t}_j)$$

is a normalization factor, and wherein $\Omega$ comprises said pairs of patients (i, j), wherein R is defined according to $$R(\hat{t}_i, \hat{t}_j) = \begin{cases} (-(\hat{t}_i - \hat{t}_j - \gamma))^n : \hat{t}_i - \hat{t}_j < \gamma \\ 0 : \text{otherwise} \end{cases},$$

wherein $\hat{t}_i$ and $\hat{t}_j$ include prognostic estimates for the patients i and j, respectively, and wherein $0 < \gamma < 1$ and $n > 1$.

18. The computer readable media according to claim 13, wherein said medical condition comprises recurrence of prostate cancer and outputting said prognostic indicator comprises outputting a prognostic indicator indicative of an amount of time in which recurrence of prostate cancer in said patient under consideration is likely to occur.

* * * * *